United States Patent
Kojo et al.

(10) Patent No.: US 9,387,876 B2
(45) Date of Patent: Jul. 12, 2016

(54) STEERING CONTROL DEVICE AND STEERING SYSTEM

(71) Applicant: TOYOTA JIDOSHA KABUSHIKI KAISHA, Toyota-shi, Aichi-ken (JP)

(72) Inventors: Takahiro Kojo, Gotenba (JP); Yoshiaki Suzuki, Shizuoka-ken (JP); Yoji Kunihiro, Susono (JP); Yoshio Kudo, Machida (JP); Masao Ueyama, Mishima (JP); Yukihide Kimura, Gotenba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/661,192

(22) Filed: Mar. 18, 2015

(65) Prior Publication Data

US 2015/0266501 A1 Sep. 24, 2015

(30) Foreign Application Priority Data

Mar. 20, 2014 (JP) ................................. 2014-059201

(51) Int. Cl.
*B62D 5/04* (2006.01)
*B62D 6/00* (2006.01)

(52) U.S. Cl.
CPC .............. *B62D 5/0463* (2013.01); *B62D 6/008* (2013.01)

(58) Field of Classification Search
CPC ......... B62D 5/04; B62D 5/0463; B62D 6/008
USPC .......................................................... 701/41
See application file for complete search history.

(56) References Cited

U.S. PATENT DOCUMENTS

| 2005/0067213 | A1* | 3/2005 | Yasui | B60G 17/0195 180/443 |
| 2006/0289226 | A1* | 12/2006 | Sugitani | B62D 6/008 180/402 |
| 2012/0330510 | A1* | 12/2012 | Kawase | B62D 5/0469 701/41 |
| 2015/0025743 | A1* | 1/2015 | Tamura | B62D 5/046 701/41 |

FOREIGN PATENT DOCUMENTS

| JP | 2004-175122 A | 6/2004 |
| WO | 2014/087546 A1 | 6/2014 |

\* cited by examiner

*Primary Examiner* — McDieunel Marc
*Assistant Examiner* — James E Stroud
(74) *Attorney, Agent, or Firm* — Sughrue Mion, PLLC

(57) ABSTRACT

A steering system includes a steering angle detection unit that detects a steering angle of a steering wheel; a steering torque detection unit that detects a steering torque with respect to the steering wheel; an ECU that calculates a corrected steering angle by nonlinearly correcting the steering angle, a first steering parameter as the product of an angular velocity of the steering angle and the steering torque, a second steering parameter as the product of the corrected steering angle and a time differential value of the steering torque, and a target control amount based on the first steering parameter and the second steering parameter; and a steering support unit that applies a rotation torque to the steering wheel based on the target control amount.

7 Claims, 5 Drawing Sheets

STEERING CONTROL DEVICE AND STEERING SYSTEM

INCORPORATION BY REFERENCE

The disclosure of Japanese Patent Application No. 2014-059201 filed on Mar. 20, 2014 including the specification, drawings and abstract is incorporated herein by reference in its entirety.

BACKGROUND OF THE INVENTION

1. Field of the Invention

The invention relates to a steering control device and a steering system for reflecting a driver's intention with respect to a steering operation to steering control for a steering device.

2. Description of Related Art

Japanese Patent Application Publication No. 2004-175122 (JP 2004-175122 A) below discloses a technique for detecting a state of a driver's operation performed on a steering wheel (steering state, release state, steering holding state, and the like) in accordance with a power obtained by integrating the product of a time differential value of a steering angle (steering angular velocity) and a steering torque and performing steering control by using the result of the detection.

The technique disclosed in JP 2004-175122 A above reflects the driver's steering operation intention to the steering control by using the steering control. However, the technique does not sufficiently allow for a vehicle steering characteristic. Accordingly, with this technique, the driver cannot have steering sensation in accordance with the vehicle steering characteristic and the driver's intention may be insufficiently reflected to the steering control.

SUMMARY OF THE INVENTION

The invention provides a steering control device that is capable of carrying out steering control to which a driver's intention is reflected.

A first aspect of the invention relates to a steering control device. The steering control device comprising: a steering angle detection unit that detects a steering angle during a steering operation of a steering wheel performed by a driver; a corrected steering angle calculation unit that calculates a corrected steering angle by nonlinearly correcting the steering angle detected by the steering angle detection unit in accordance with a steering characteristic of a vehicle; a first steering parameter calculation unit that calculates the product of a steering angular velocity and a steering torque during the steering operation as a first steering parameter; a second steering parameter calculation unit that calculates the product of the corrected steering angle and a time differential value of the steering torque during the steering operation as a second steering parameter; a steering power calculation unit that calculates a steering power showing a steering type of the driver with respect to the steering wheel based on the first steering parameter and the second steering parameter; and a control amount calculation unit that calculates a target control amount of an actuator of a steering device based on the steering power.

A second aspect of the invention relates to a steering system. The steering system includes a steering angle detection unit that detects a steering angle of a steering wheel; a steering torque detection unit that detects a steering torque with respect to the steering wheel; an ECU that calculates a corrected steering angle by nonlinearly correcting the steering angle, a first steering parameter as the product of an angular velocity of the steering angle and the steering torque, a second steering parameter as the product of the corrected steering angle and a time differential value of the steering torque, and a target control amount based on the first steering parameter and the second steering parameter; and a steering support unit that applies a rotation torque to the steering wheel based on the target control amount.

According to the steering control device and the steering system of the invention, the target control amount of the actuator (steering support unit) of the steering device is calculated based on the steering power, and thus control to which the driver's steering operation intention is reflected can be carried out.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of a steering control device according to the invention will be described in detail with reference to accompanying drawings. The invention is not limited by the embodiment.

The embodiment of the steering control device according to the invention will be described with reference to FIGS. 1 to 4.

Figure 1:
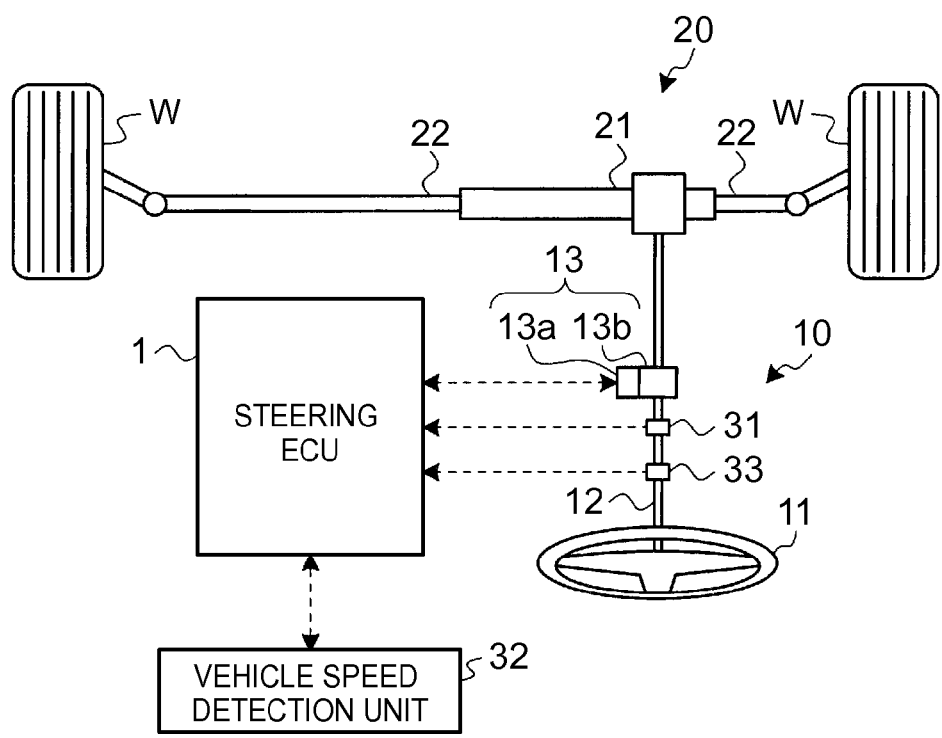
FIG. 1 is a diagram illustrating an example of a steering device to which a steering control device according to the invention is applied.

The steering control device according to this embodiment is provided with an electronic control device (hereinafter, referred to as a "steering ECU") 1 that performs computation processing relating to steering control (described later) (FIG. 1).

A steering device 10, which is a control target of the steering ECU 1, and a turning device 20 will be described.

The steering device 10 is provided with a steering wheel 11 and a rotating shaft (hereinafter, referred to as a "steering shaft") 12 that is connected to the steering wheel 11, and transmits rotation torque of the steering shaft 12 to the turning device 20.

The turning device 20 turns turning wheels W at a turning angle corresponding to a steering angle θs of the steering wheel 11 steered by a driver. The turning device 20 is provided with a gear mechanism 21 that converts the rotation torque transmitted from the steering device 10 into a turning force (axial force). The gear mechanism 21 is, for example, a so-called rack-and-pinion mechanism that uses a rack gear and a pinion gear (not illustrated). The gear mechanism 21 turns the turning wheels W by transmitting the turning force to the turning wheels W via respective right and left tie rods 22.

The steering device 10 according to this embodiment is configured as an electronic power steering (EPS) device that supports a steering operation by the driver. For example, in the steering device 10, assist control, damping control, and the like are carried out as the steering control relating to the support. The assist control and the damping control are carried out by using torque that is generated by a steering support unit 13.

The steering support unit 13 is disposed as an actuator of the steering device 10 and is provided with an electric motor 13a and a decelerator 13b. The decelerator 13b has, for example, two gears. One of the gears is fixed to the concentric steering shaft 12 and the other gear is fixed to an output shaft of the electric motor 13a. The steering support unit 13 generates the torque in the steering shaft 12 by transmitting output torque of the electric motor 13a to the steering shaft 12 via the decelerator 13b. In other words, the steering support unit 13 applies rotation torque to the steering wheel 11 that is connected to the steering shaft 12. An operation of the electric motor 13a is controlled by a support control unit of the steering ECU 1.

The assist control is control for reducing the driver's steering wheel 11 operating force by allowing steering assist torque, which shares the driver's steering direction (direction of rotation of the steering shaft 12), to act on the steering shaft 12.

Herein, a force for returning to a neutral position (turning angle zero) (restoring force caused by self-aligning torque, road surface reaction force, or the like) acts on the turning wheels W in a turning state. This force acts as a force directed to push back the steering wheel 11 during the steering operation. Accordingly, if the steering assist torque acts alone, return sensation is intensified during a return operation of the steering wheel 11 and the returning (property to return the steering wheel 11 to the neutral position) of the steering wheel 11 may be reduced. Accordingly, the steering device 10 carries out not only the assist control but also the damping control.

The damping control is control for generating a damping force simulating damping corresponding to the viscosity characteristic of the steering device 10 and suppressing a steering angular velocity θs' of the steering wheel 11 by using the damping force. In other words, the damping control is to ensure the returning of the steering wheel 11 and give responsive sensation (return sensation) during the steering operation by generating the damping force.

The steering ECU 1 is provided with an assist amount calculation unit, a damping amount calculation unit, and a control amount calculation unit.

The assist amount calculation unit calculates a basic assist control amount for the assist control. The basic assist control amount is a reference value for the steering assist torque and is calculated based on a steering torque Ts with respect to the steering wheel 11 and a vehicle speed V during the steering operation. The steering torque Ts is detected by a torque detection unit 31. The torque detection unit 31 is, for example, a resolver sensor that is arranged on the steering shaft 12 and can detect not only the magnitude of the torque but also the direction of the torque with respect to the neutral position of the steering wheel 11. The vehicle speed V is detected by a vehicle speed detection unit 32. A rotation sensor that detects rotation of an output shaft of a transmission of a power transmission device (not illustrated), a vehicle wheel speed sensor that detects a vehicle wheel speed, or the like is used as the vehicle speed detection unit 32.

Figure 2:
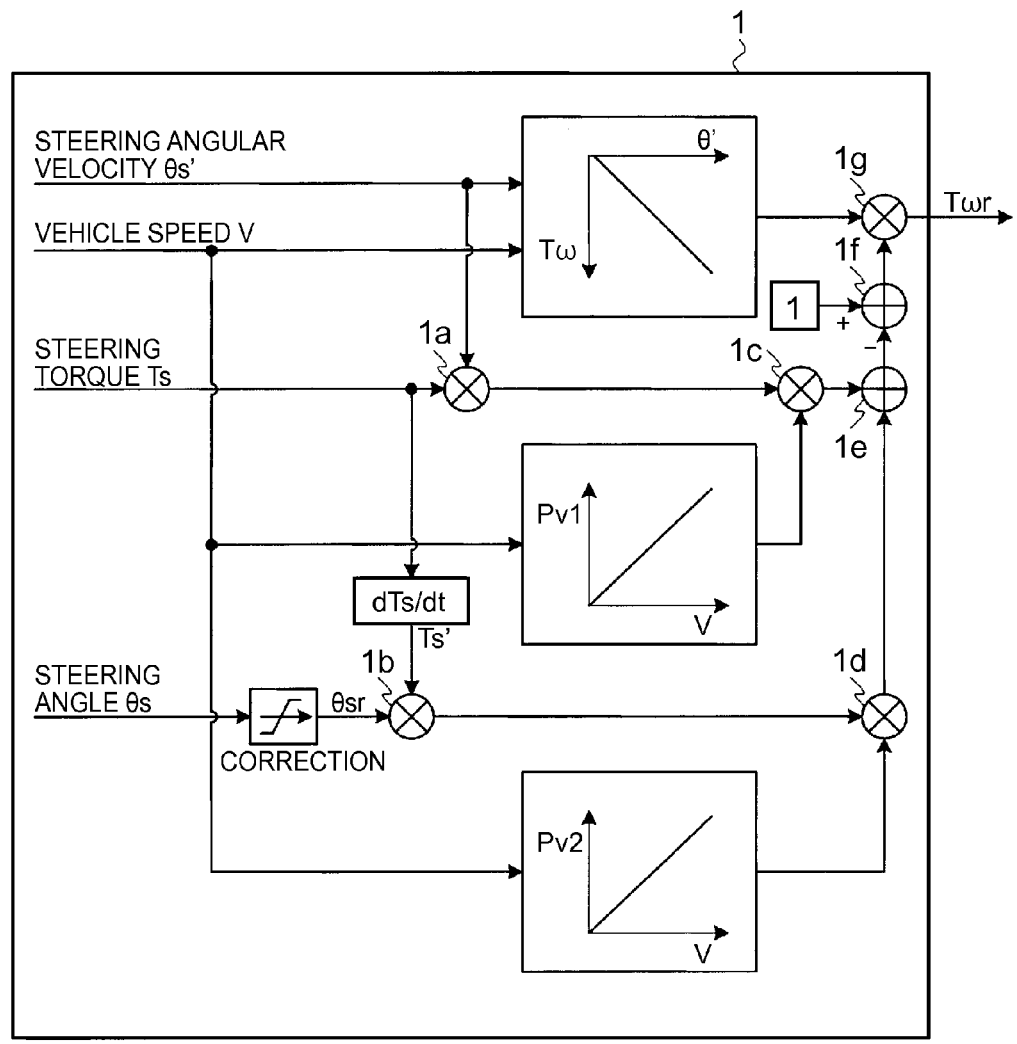
FIG. 2 is a diagram showing computation processing by a steering ECU.

The damping amount calculation unit calculates a damping compensation amount Tω for the damping control for correcting the basic assist control amount. The damping compensation amount Tω is a target damping force corresponding to a target value of the damping force and is calculated based on the steering angular velocity θs' and the vehicle speed V during the steering operation. The steering angular velocity θs' is a time differential value of the steering angle θs during the steering operation that is detected by a steering angle detection unit 33. The steering angle detection unit 33 is an angle sensor that detects a rotation angle of the steering shaft 12 as the steering angle θs and can detect not only the angle but also the steering direction with respect to the neutral position of the steering wheel 11. The steering angular velocity θs' may also be detected by a steering angular velocity detection unit. Specifically, the damping amount calculation unit calculates the damping compensation amount Tω allowing the steering angular velocity θs to be suppressed (that is, allowing interference with the rotation of the steering wheel 11) as the steering angular velocity θs during the steering operation increases (FIG. 2).

The control amount calculation unit calculates the sum of the basic assist control amount and the damping compensation amount Tω. The sum is a target control amount for the torque that is generated in the steering shaft 12. The target control amount is a target support torque (=reference value of the steering assist torque+target damping torque) that is generated in the steering shaft 12 and is the basic assist control amount that is corrected by using the damping compensation amount Tω.

The support control unit controls the electric motor 13a based on the target control amount and carries out the assist control and the damping control by generating the target support torque in the steering shaft 12. As the driver rotates the steering wheel 11 fast and as the turning wheels W return quickly to the neutral position due to the self-aligning torque or the like (as the steering wheel 11 returns fast to the neutral position), the movements are suppressed in the steering device 10, and thus the returning of the steering wheel 11 is improved.

The driver's steering operation can be broadly classified into two types, one being active steering and the other being passive steering. The active steering is an aggressive (active) type of steering that is purposefully performed by the driver. The passive steering is a type of steering other than the active steering. Specifically, the passive steering is a type of steering that is performed by the driver in response to the transmission of the restoring force caused by the self-aligning torque or the like to the steering wheel 11. In other words, the passive steering is a type of steering for steering holding that is performed so as to hold the steering angle θs during turning (turning radius not changing) to be constant. The passive steering also includes steering holding for holding the steering wheel 11 at the neutral position in a state where the restoring force or the like is not transmitted.

In this example, the damping compensation amount Tω is adjusted in accordance with the driver's steering type so that the damping control is carried out with the driver's steering operation intention being reflected. In the case of the active steering, for example, the damping compensation amount $T\omega$ is smaller and the damping force is smaller than in the case of the passive steering.

The driver's steering type is determined by a steering type determination unit of the steering ECU 1. The steering type determination unit performs the determination based on a value (hereinafter, referred to as a "steering power") P relating to power of the steering operation.

The steering power P shows the driver's steering type with respect to the steering wheel 11. The steering power P is calculated based on a first steering parameter P1 and a second steering parameter P2. Specifically, the sum of the product of a first vehicle speed gain Pv1 and the first steering parameter P1 and the product of a second vehicle speed gain Pv2 and the second steering parameter P2 is calculated as the steering power P as shown in FIG. 2 and the following Equation 1.

$$P=Pv1*P1+Pv2*P2 \tag{1}$$

Each of the first vehicle speed gain Pv1 and the second vehicle speed gain Pv2 is a gain corresponding to the vehicle speed V. The first vehicle speed gain Pv1 and the second vehicle speed gain Pv2 in this example increase as the vehicle speed V increases. In the example of FIG. 2, the vehicle speed V and the first vehicle speed gain Pv1 or the second vehicle speed gain Pv2 are linearly changed.

The first steering parameter P1 is the product of the steering angular velocity $\theta s'$ and the steering torque Ts during the steering operation (Equation 2). The first steering parameter P1 is calculated by a first steering parameter calculation unit (first multiplier 1a illustrated in FIG. 2) of the steering ECU 1. The second steering parameter P2 is the product of a corrected steering angle $\theta sr$, which is the nonlinearly corrected steering angle $\theta s$ during the steering operation, and a time differential value (hereinafter, referred to as a "steering torque differential value") Ts' of the steering torque Ts during the steering operation (Equation 3). The second steering parameter P2 is calculated by a second steering parameter calculation unit (second multiplier 1b illustrated in FIG. 2) of the steering ECU 1. Sign 1c that is illustrated in FIG. 2 refers to a third multiplier for obtaining the product of the first steering parameter P1 and the first vehicle speed gain Pv1. Sign 1d refers to a fourth multiplier for obtaining the product of the second steering parameter P2 and the second vehicle speed gain Pv2.

$$P1=\theta s'*Ts \tag{2}$$

$$P2=\theta sr*Ts' \tag{3}$$

The steering power P is obtained by adding the product obtained by the third multiplier 1c and the product obtained by the fourth multiplier 1d to a steering power calculation unit (first adder 1e) of the steering ECU 1.

The steering type determination unit determines the steering as the passive steering when, for example, the steering power P is equal to or less than a first threshold (<0). The steering type determination unit determines the steering as the active steering when, for example, the steering power P is equal to or greater than a second threshold (>0). In addition, the steering type determination unit may determine the steering as the passive steering when, for example, the steering power P exceeds the first threshold and is exceeded by zero. In addition, the steering type determination unit may determine the steering as the active steering when, for example, the steering power P exceeds zero and is exceeded by the second threshold.

The steering ECU 1 is further provided with a second adder 1f and a fifth multiplier 1g. The second adder 1f adds one to the steering power P and sends the result to the fifth multiplier 1g. The fifth multiplier 1g multiplies the sum from the second adder 1f by the damping compensation amount $T\omega$ obtained by the damping amount calculation unit so as to correct the damping compensation amount $T\omega$ into a corrected value $T\omega r$ that reflects the driver's steering type.

Hereinafter, the corrected steering angle $\theta sr$ will be described.

The corrected steering angle $\theta sr$ is calculated by a corrected steering angle calculation unit of the steering ECU 1. The corrected steering angle $\theta sr$ is the steering angle $\theta s$ that is nonlinearly corrected based on the amount of change of the turning force (axial force) of the turning wheels W per unit time with respect to the amount of change of the detected steering angle $\theta s$ (that is, vehicle steering characteristic) per unit time. The corrected steering angle calculation unit performs the nonlinear correction of the detected steering angle $\theta s$ by using, for example, a nonlinear correction amount corresponding to the vehicle steering characteristic (correction coefficient and corrected value). In other words, the corrected steering angle calculation unit calculates a corrected steering angle $\theta sr$ by nonlinearly correcting the steering angle $\theta s$.

Figure 3:
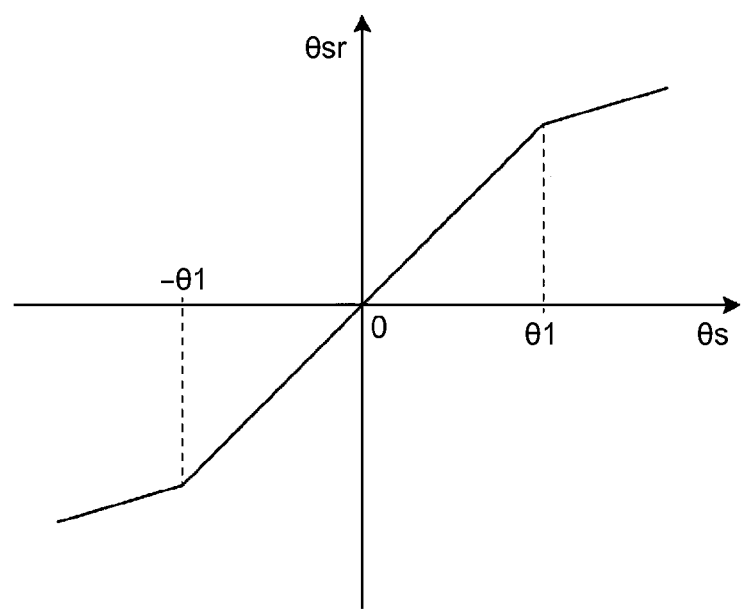
FIG. 3 is a diagram illustrating an example of a steering angle-corrected steering angle correspondence relationship map.

FIG. 3 is a map illustrating an example of a correspondence relationship between the steering angle $\theta s$ and the corrected steering angle $\theta sr$. The correspondence relationship is applied to a vehicle in which the amount of change of the turning force (axial force) of the turning wheels W per unit time is exceeded by the amount of change of the steering angle $\theta s$ per unit time in a case where the absolute value of the detected steering angle $\theta s$ exceeds a first angle $\theta 1$ (>0). This vehicle has, for example, the suspension characteristic of the turning force (axial force) reducing in the vicinity of a steering termination of the steering wheel 11. In this type of vehicle, the return sensation is less likely to be generated in the vicinity of the steering termination. Accordingly, in this vehicle, calculation of the steering power P by using the detected steering angle $\theta s$ as it is results in a linearly proportional increase in the corrected value $T\omega r$ of the damping compensation amount in conjunction with an increase in the steering angle $\theta s$, and thus the damping control results in overdamping in the vicinity of the steering termination and the driver may feel uncomfortable due to the excessive return sensation. In addition, the steering torque differential value Ts' that constitutes the second steering parameter P2 has a higher level of sensitivity than the steering angle $\theta s$ with respect to control stability. Accordingly, in a case where the steering power P is calculated by using the detected steering angle $\theta s$ as it is, the corrected value $T\omega r$ of the damping compensation amount excessively increases and the stability of the damping control may be reduced.

Herein, the correction amount is set for the amount of change of the corrected steering angle $\theta sr$ per unit time with respect to the amount of change of the steering angle $\theta s$ per unit time to be smaller in a case where the absolute value of the detected steering angle $\theta s$ exceeds the first angle $\theta 1$ than in a case where the absolute value is equal to or less than the first angle $\theta 1$. In addition, the correction amount is set for the amount of change of the steering angle $\theta s$ per unit time to be equal to the amount of change of the corrected steering angle $\theta sr$ per unit time in a case where the absolute value ranges from zero to the first angle $\theta 1$. However, the amounts of change per unit time do not necessarily have to be equal to each other in the case where the absolute value of the steering angle $\theta s$ ranges from zero to the first angle $\theta 1$. In other words, the ECU 1 calculates the corrected steering angle $\theta sr$ such that an amount of change of the corrected steering angle $\theta sr$ with respect to an amount of change of the steering angle $\theta s$ in a case where the absolute value of the steering angle θs exceeds the first angle θ1 is smaller than the amount of change of the corrected steering angle θsr with respect to the amount of change of the steering angle θs in a case where the absolute value of the steering angle θs is equal to or less than the first angle θ1.

The corrected steering angle calculation unit calculates the corrected steering angle θsr corresponding to the detected steering angle θs from the correspondence relationship map that is illustrated in FIG. 3. Specifically, the corrected steering angle calculation unit calculates the corrected steering angle θsr with an amount of change per unit time smaller than the amount of change of the detected steering angle θs per unit time in a case where the steering angle θs exceeds the first angle θ1 (θs>θ1) or in a case where the steering angle θs is exceeded by the first angle θ1*(−1) (θs<−θ1). In addition, the corrected steering angle calculation unit calculates the detected steering angle θs as the corrected steering angle θsr as it is in a case where the steering angle θs is equal to or less than the first angle θ1*(−1) and is equal to or greater than the first angle θ1 (−θ1≤θs≤θ1). The second steering parameter calculation unit obtains the second steering parameter P2 by multiplying the corrected steering angle θsr by the steering torque differential value Ts'.

The control amount calculation unit calculates the sum of the corrected value Tωr of the damping compensation amount allowing for the corrected steering angle θsr and the basic assist control amount. The sum is the target control amount for the torque that is generated in the steering shaft 12. The support control unit controls the electric motor 13a based on the target control amount and generates the target support torque in the steering shaft 12 so as to carry out the assist control and the damping control.

As described above, the steering control device according to this embodiment allows for the steering power P during the calculation of the corrected value Tωr of the damping compensation amount. Accordingly, the damping control is carried out with the driver's steering operation intention being reflected.

In addition, this steering control device suppresses the amount of change of the corrected value Tωr of the damping compensation amount per unit time with respect to the amount of change of the steering angle θs per unit time to be small in a case where the absolute value of the steering angle θs during the steering operation exceeds the first angle θ1. Accordingly, an excessive increase in the corrected value Tωr can be suppressed. For example, the overdamping during the damping control in the vicinity of the steering termination can be suppressed and the driver can be given the return sensation with little discomfort in accordance with the vehicle steering characteristic. In addition, this steering control device obtains the corrected value Tωr of the damping compensation amount based on the product of the corrected steering angle θsr with a small p amount of change per unit time with respect to the steering angle θs per unit time and the high-sensitivity steering torque differential value Ts' in a case where the absolute value of the steering angle θs during the steering operation exceeds the first angle θ1. Accordingly, an effect of the high-sensitivity steering torque differential value Ts' is more likely to be reflected to the value of the steering power P than when the corrected value Tωr is obtained by using the detected steering angle θs. Accordingly, the stability of the damping control can be improved while steering sensation with little discomfort is achieved.

Compared to a case where the absolute value of the detected steering angle θs exceeds the first angle θ1, this steering control device has the corrected value Tωr of the damping compensation amount having a magnitude that corresponds to the steering angle θs in a case where the absolute value is equal to or less than the first angle θ1. Accordingly, the driver can be given a sufficient return sensation in accordance with the vehicle steering characteristic.

This steering control device obtains the steering power P by using the corrected steering angle θsr that is nonlinearly corrected in accordance with the vehicle steering characteristic and obtains the corrected value Tωr of the damping compensation amount by using the steering power P. Accordingly, the driver can be given the steering sensation with little discomfort in accordance with the vehicle steering characteristic in every area of the steering angle θs and the damping control can be carried out stably with the driver's steering operation intention being reflected.

In the example of FIG. 3, the amount of change of the corrected steering angle θsr per unit time with respect to the amount of change of the steering angle θs per unit time is smaller in a case where the absolute value of the steering angle θs during the steering operation exceeds the first angle θ1 than in a case where the absolute value is equal to or less than the first angle θ1. The correspondence relationship map between the steering angle θs and the corrected steering angle θsr that is illustrated in FIG. 4, which shows a type differing from that of the example of FIG. 3, is applied to a similar vehicle.

Figure 4:
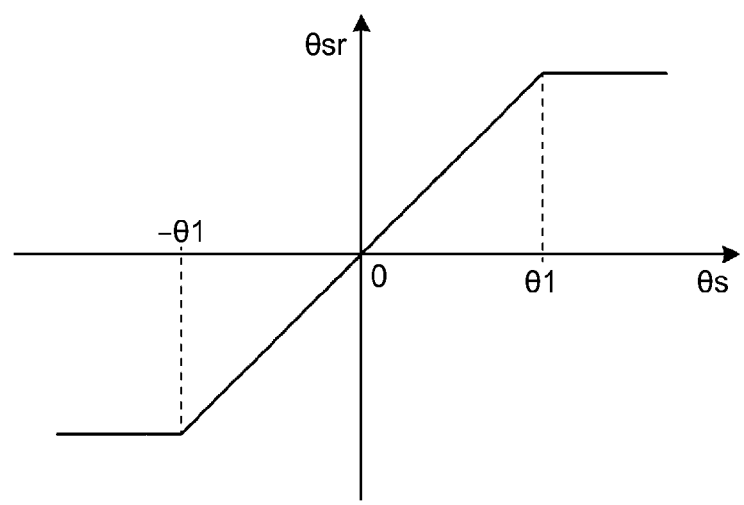
FIG. 4 is a diagram illustrating an example of a steering angle-corrected steering angle correspondence relationship map.

According to the correspondence relationship map of FIG. 4, the correction amount is set for the corrected steering angle θsr to be constant at the corrected steering angle θsr at the first angle θ1 in a case where the absolute value of the detected steering angle θs exceeds the first angle θ1. In a case where the steering angle θs exceeds the first angle θ1 (θs>θ1) or in a case where the steering angle θs is exceeded by the first angle θ1*(−1) (θs<−θ1), the corrected steering angle calculation unit calculates the corrected steering angle θsr at the first angle θ1 as the corrected steering angle θsr in this case. In other words, an upper limit guard value in a case where the steering angle θs exceeds the first angle θ1 (θs>θ1) and a lower limit guard value in a case where the steering angle θs is exceeded by the first angle θ1*(−1) (θs<−θ1) are set for this correction amount. In a case where the absolute value of the steering angle θs ranges from zero to the first angle θ1, the correction amount may be set as in the example described above. In the example of FIG. 4, the correction amount is set as in the example of FIG. 3.

The support control unit carries out the assist control and the damping control by using the target control amount based on the corrected value Tωr of the damping compensation amount that allows for the corrected steering angle θsr.

Even in this case, the steering control device according to this embodiment allows for the steering power P during the calculation of the corrected value Tωr of the damping compensation amount, and thus the damping control is carried out with the driver's steering operation intention being reflected.

In addition, this steering control device can suppress an excessive increase in the corrected value Tωr of the damping compensation amount by using the upper limit guard value or the lower limit guard value in a case where the absolute value of the steering angle θs during the steering operation exceeds the first angle θ1. Accordingly, for example, the overdamping during the damping control in the vicinity of the steering termination can be suppressed and the driver can be given the return sensation with little discomfort in accordance with the vehicle steering characteristic. In addition, this steering control device obtains the corrected value Tωr of the damping compensation amount based on the product of the corrected steering angle θsr limited by the upper limit guard value or the lower limit guard value and the high-sensitivity steering torque differential value Ts' in a case where the absolute value of the steering angle θs during the steering operation exceeds the first angle θ1. Accordingly, the effect of the high-sensitivity steering torque differential value Ts' is more likely to be reflected to the value of the steering power P than when the corrected value Tωr is obtained by using the detected steering angle θs. Accordingly, the stability of the damping control can be improved while the steering sensation with little discomfort is achieved.

Compared to a case where the absolute value of the detected steering angle θs exceeds the first angle θ1, this steering control device has the corrected value Tωr of the damping compensation amount having the magnitude that corresponds to the steering angle θs in a case where the absolute value is equal to or less than the first angle θ1. Accordingly, the driver can be given the sufficient return sensation in accordance with the vehicle steering characteristic.

This steering control device obtains the steering power P by using the corrected steering angle θsr that is nonlinearly corrected in accordance with the vehicle steering characteristic and obtains the corrected value Tωr of the damping compensation amount by using the steering power P. Accordingly, the driver can be given the steering sensation with little discomfort in accordance with the vehicle steering characteristic in every area of the steering angle θs and the damping control can be carried out stably with the driver's steering operation intention being reflected.

It is desirable that the range of the steering angle θs that is limited by the upper limit guard value or the lower limit guard value (that is, the first angle θ1) is determined with the transmission characteristic of the steering torque differential value Ts' allowed for.

First Modification Example

In an area of the vehicle in the vicinity of the steering angle θs=0 (neutral position of the steering wheel 11), frictional resistance such as sliding resistance in the steering device 10 and the turning device 20 surpasses the restoring force caused by the self-aligning torque, and thus the return sensation is less likely to be generated in the steering wheel 11 compared to the case of a steering angle θs greater than in this area. This unlikelihood of the generation of the return sensation increases as the steering angle θs approaches zero. Accordingly, in a case where, for example, the corrected value Tωr of the damping compensation amount is calculated with the steering angle θs that is detected in this area being the corrected steering angle θsr as it is, the damping control results in the overdamping due to an excessively high corrected value Tωr and the driver may feel uncomfortable due to the excessive return sensation. In this case, deviation occurs between the driver's return sensation perceptions in this area and the area of the remaining steering angle θs, and the stability of the damping control may be reduced.

The steering control device according to this modification example is configured for the steering sensation in the area of the steering control device of the embodiment where the return sensation is less likely to be generated (area in the vicinity of the steering angle θs=0) not to make the driver feel uncomfortable.

Figure 5:
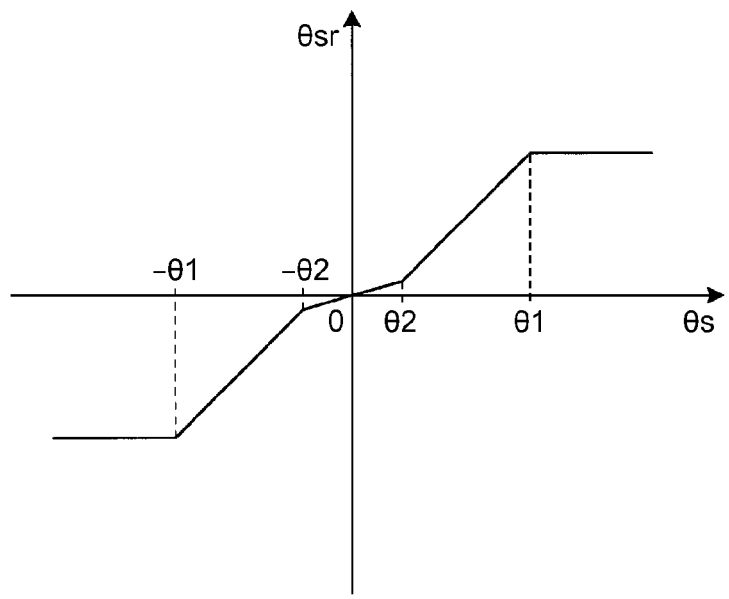
FIG. 5 is a diagram illustrating an example of a steering angle-corrected steering angle correspondence relationship map.

Specifically, the correction amount is determined so that the correspondence relationship between the steering angle θs and the corrected steering angle θsr is as illustrated in the correspondence relationship map of FIG. 5. This correction amount is set as with the correction amount of the embodiment in a case where the absolute value of the detected steering angle θs exceeds the first angle θ1. In addition, in the case of the area where the return sensation is less likely to be generated (in a case where the absolute value of the detected steering angle θs is equal to or less than a second angle θ2 that is exceeded by the first angle θ1), this correction amount is set for the amount of change of the corrected steering angle θsr per unit time with respect to the amount of change of the steering angle θs per unit time to be smaller than in a case where the absolute value exceeds the second angle θ2 and is equal to or less than the first angle θ1. Regarding the correction amount in this case, it is desirable that the amount of change of the corrected steering angle θsr per unit time is decreased as the steering angle θs approaches zero. In a case where the absolute value exceeds the second angle θ2 and is equal to or less than the first angle θ1, the amount of change of the steering angle θs per unit time and the amount of change of the corrected steering angle θsr per unit time are set to be equal to each other. However, the amounts of change per unit time do not necessarily have to be equal to each other in this case.

The support control unit carries out the assist control and the damping control by using the target control amount based on the corrected value Tωr of the damping compensation amount that allows for the corrected steering angle θsr.

Even in this modification example, the steering control device allows for the steering power P during the calculation of the corrected value Tωr of the damping compensation amount, and thus the damping control is carried out with the driver's steering operation intention being reflected.

In addition, this steering control device can achieve effects similar to those in a case where the absolute value of the steering angle θs is equal to or less than the first angle θ1 in the embodiment in a case where the absolute value of the steering angle θs during the steering operation exceeds the second angle θ2 and is equal to or less than the first angle θ1. In addition, this steering control device can achieve effects similar to those in a case where the absolute value of the steering angle θs exceeds the first angle θ1 in the embodiment even in a case where the absolute value exceeds the first angle θ1.

In addition, even in a case where the absolute value is equal to or less than the second angle θ2, this steering control device suppresses the amount of change of the corrected value Tωr of the damping compensation amount per unit time with respect to the amount of change of the steering angle θs per unit time to be small as in a case where the absolute value exceeds the first angle θ1. Accordingly, an excessive increase in the corrected value Tωr can be suppressed. Accordingly, in this steering control device, the overdamping during the damping control is suppressed in a case where the absolute value of the steering angle θs is equal to or less than the second angle θ2, and thus the driver can be given the return sensation with little discomfort in accordance with the vehicle steering characteristic. In particular, the amount of change of the corrected steering angle θsr per unit time with respect to the amount of change of the steering angle θs per unit time is decreased as the steering angle θs approaches zero in this steering control device, and thus the generation of the return sensation caused by the damping control is suppressed as the steering angle θs approaches zero. Accordingly, the driver can be given the steering sensation with less discomfort.

This steering control device obtains the steering power P by using the corrected steering angle θsr that is nonlinearly corrected in accordance with the vehicle steering characteristic and obtains the corrected value Tωr of the damping compensation amount by using the steering power P. Accordingly, the driver can be given the steering sensation with little discomfort in accordance with the vehicle steering characteristic in every area of the steering angle θs and the damping control can be carried out stably with the driver's steering operation intention being reflected.

Figure 6:
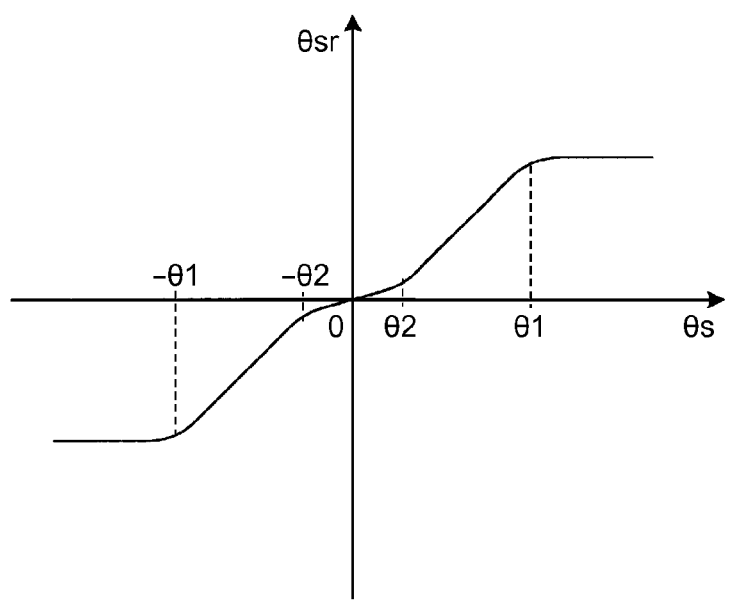
FIG. 6 is a diagram illustrating an example of a steering angle-corrected steering angle correspondence relationship map.

It is desirable that the correction amount according to this modification example allows a gradual switch in the amount of change of the corrected steering angle θsr per unit time with respect to the amount of change of the steering angle θs per unit time, as illustrated in the correspondence relationship map in FIG. 6, before and after a switch in the amount of change per unit time (ahead of and behind the first angle θ1, ahead of and behind the first angle θ1*(−1), ahead of and behind the second angle θ2, and ahead of and behind the second angle θ2*(−1)). In this case, this steering control device gradually changes the return sensation in advance and later compared to a rapid switch in the amount of change per unit time that is illustrated in FIG. 5, and thus the steering sensation can be less uncomfortable.

Second Modification Example

In the steering control device according to each of the embodiment described above and the first modification example, the amount of change of the corrected steering angle θsr per unit time with respect to the amount of change of the steering angle θs is small in a case where, for example, the absolute value of the detected steering angle θs exceeds the first angle θ1. This is because the application target of this case is a vehicle in which the amount of change of the turning force of the turning wheels W is small with respect to the amount of change of the steering angle θs per unit time. However, in some vehicles, the amount of change of the turning force of the turning wheels W may be large with respect to the amount of change of the steering angle θs per unit time. In addition, depending on vehicles, the amount of change of the turning force of the turning wheels W may be small with respect to the amount of change of the steering angle θs per unit time in an area of the steering angle θs and the amount of change of the turning force of the turning wheels W may be large with respect to the amount of change of the steering angle θs per unit time in another area of the steering angle θs.

In the steering angle calculation unit according to this modification example, the amount of change of the corrected steering angle θsr per unit time with respect to the amount of change of the steering angle θs per unit time is increased if, for example, the amount of change of the turning force of the turning wheels W per unit time is large with respect to the amount of change of the steering angle θs per unit time in a case where the absolute value of the detected steering angle θs exceeds a third angle θ3 and is exceeded by a fourth angle θ4. In this case, the steering control device according to this modification example obtains the steering power P by using the corrected steering angle θsr that is nonlinearly corrected in accordance with the vehicle steering characteristic and obtains the corrected value Tωr of the damping compensation amount by using the steering power P as is the case with the steering control device according to each of the embodiment and the first modification example even in a vehicle having the characteristic described above. Accordingly, the driver can be given the steering sensation with little discomfort in accordance with the vehicle steering characteristic in every area of the steering angle θs and the damping control can be carried out stably with the driver's steering operation intention being reflected.

Third Modification Example

Some vehicles are provided with a steering angle variation device such as a variable gear ratio steering (VGRS) system. This steering angle variation device changes a steering gear ratio in accordance with the vehicle speed V or the like and adjusts the turning angle with respect to the steering angle θs in accordance with the vehicle speed V or the like.

In a case where the steering control device according to this modification example is applied to this type of vehicle, the steering control device according to this modification example adjusts the amount of change of the corrected steering angle θsr per unit time with respect to the amount of change of the steering angle θs per unit time allowing for the change characteristic of the turning angle with respect to the steering angle θs. For example, in a case where the turning angle with respect to the steering angle θs is set to be greater than before control intervention by the steering angle variation device after control is carried out by the steering angle variation device, the corrected steering angle calculation unit according to this modification example adjusts the corrected steering angle θsr that is calculated in the embodiment and the first and second modification examples described above in accordance with the change characteristic and calculates a corrected steering angle θsr that is greater than the corrected steering angle θsr of the embodiment and the like. In addition, in a case where the turning angle with respect to the steering angle θs is set to be less than before the control intervention by the steering angle variation device, this corrected steering angle calculation unit adjusts the corrected steering angle θsr that is calculated in the embodiment and the first and second modification examples described above in accordance with the change characteristic and calculates a corrected steering angle θsr that is less than the corrected steering angle θsr of the embodiment and the like.

In this manner, the steering control device according to this modification example calculates the corrected steering angle θsr that is nonlinearly corrected in accordance with the vehicle steering characteristic and allows for the change characteristic even in a vehicle having the change characteristic of the turning angle with respect to the steering angle θs, and thus the driver can be given the steering sensation with little discomfort with respect to the vehicle steering characteristic and the change characteristic of the turning angle with respect to the steering angle θs in every area of the steering angle θs and the damping control can be carried out stably with the driver's steering operation intention being reflected.

In addition, depending on vehicles, an output characteristic of the turning force (axial force) with respect to the steering angle θs may be dynamically changed when a vehicle characteristic is changed by a vehicle characteristic variation device. Examples of the vehicle characteristic variation device include a rear wheel steering (dynamic rear steering, DRS) system, a suspension characteristic adjustment device, and a vehicle height adjustment device. The rear wheel steering system uses not only front wheels but rear wheels as the turning wheels and, for example, changes the output characteristic of the turning force (axial force) to the front wheels with respect to the steering angle θs in accordance with whether the rear wheels are turned or not. The suspension characteristic adjustment device automatically adjusts a suspension characteristic such as a camber angle and a toe angle and changes the output characteristic of the turning force (axial force) with respect to the steering angle θs in accordance with the suspension characteristic. The vehicle height adjustment device is a so-called air suspension and changes the suspension characteristic such as the camber angle in accordance with, for example, the height of the vehicle. Accordingly, this vehicle height adjustment device is regarded as a type of suspension characteristic adjustment device and changes the output characteristic of the turning force (axial force) with respect to the steering angle θs in accordance with the height of the vehicle.

In a case where the steering control device according to this modification example is applied to this type of vehicle, the steering control device according to this modification example adjusts the per unit time amount of change of the corrected steering angle θsr per unit time with respect to the amount of change of the steering angle θs per unit time allowing for the change characteristic of the turning force (axial force) with respect to the steering angle θs resulting from an operation of the vehicle characteristic variation device. For example, in a case where the turning force (axial force) with respect to the steering angle θs is greater than before control intervention by the vehicle characteristic variation device after control is carried out by the vehicle characteristic variation device, the corrected steering angle calculation unit according to this modification example adjusts the corrected steering angle θsr that is calculated in the embodiment and the first and second modification examples described above in accordance with the change characteristic and calculates a corrected steering angle θsr that is greater than the corrected steering angle θsr of the embodiment and the like. In addition, in a case where the turning force (axial force) with respect to the steering angle θs is less than before the control intervention by the vehicle characteristic variation device, this corrected steering angle calculation unit adjusts the corrected steering angle θsr that is calculated in the embodiment and the first and second modification examples described above in accordance with the change characteristic and calculates a corrected steering angle θsr that is less than the corrected steering angle θsr of the embodiment and the like.

In this manner, the steering control device according to this modification example calculates the corrected steering angle θsr that is nonlinearly corrected in accordance with the vehicle steering characteristic and allows for the change characteristic even in a vehicle in which the turning force (axial force) with respect to the steering angle θs is changed as a result of the change in the vehicle characteristic, and thus the driver can be given the steering sensation with little discomfort with respect to the vehicle steering characteristic and the change characteristic of the turning force (axial force) with respect to the steering angle θs in every area of the steering angle θs and the damping control can be carried out stably with the driver's steering operation intention being reflected.

Herein, each of the steering angle variation device and the vehicle characteristic variation device can also be referred to as a turning characteristic variation device that changes a turning characteristic (characteristic of turning angle or turning force) of the turning wheels W with respect to the steering angle θs.

Figure 7:
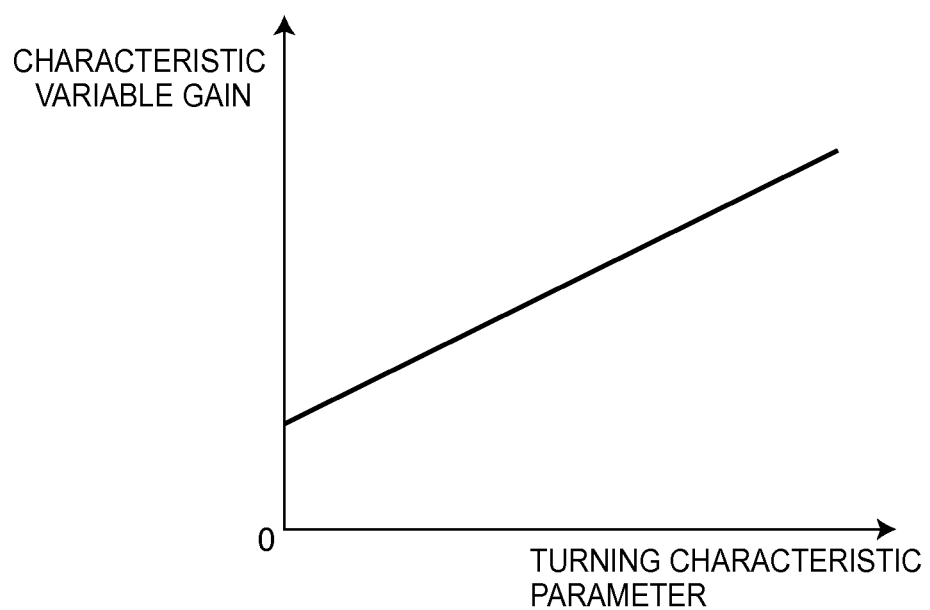
FIG. 7 is a diagram illustrating an example of a turning characteristic parameter-characteristic variable gain correspondence relationship map.

Specifically, the corrected steering angle calculation unit according to this modification example corrects the amount of change of the corrected steering angle θsr per unit time with respect to the amount of change of the steering angle θs per unit time based on a characteristic variable gain in accordance with the change in the turning characteristic of the turning characteristic variation device and calculates the corrected steering angle θsr in accordance with the detected steering angle θs based on the correspondence relationship between the corrected steering angle θs and the corrected steering angle θsr. FIG. 7 is a conceptual diagram illustrating a map of the correspondence relationship between a turning characteristic parameter (turning angle or turning force) and the characteristic variable gain. The correspondence relationship shows linearity since this drawing is a conceptual diagram. However, the correspondence relationship may also be a nonlinear correspondence relationship.

When the steering angle θs is detected, for example, the corrected steering angle calculation unit calculates the corrected steering angle θsr based on the steering angle θs from, for example, the correspondence relationship map that is illustrated in FIG. 6. This corrected steering angle calculation unit detects the turning characteristic parameter and calculates the characteristic variable gain in accordance with this turning characteristic parameter from the correspondence relationship map. Then, the corrected steering angle calculation unit obtains the product of the calculated corrected steering angle θsr and the characteristic variable gain and this is the corrected steering angle θsr that is used in calculating the second steering parameter P2. In this manner, the steering control device according to this modification example allows for even the change in the turning characteristic of the turning characteristic variation device, and thus the effects described above can be achieved.

Fourth Modification Example

In the steering control device according to each of the embodiment and the first to third modification examples described above, the calculation of the second steering parameter P2 is performed by using the corrected steering angle θsr that is the nonlinearly corrected value of the steering angle θs. In the steering control device according to this modification example, an estimated steering angle θse is calculated based on the turning force (axial force) and the product of the estimated steering angle θse and the steering torque differential value Ts' is the second steering parameter P2 (Equation 4). This is because an effect of the change in the turning force (axial force) is reflected to the corrected steering angle θsr and the estimated steering angle θse can be calculated as an equivalent to the corrected steering angle θsr according to the first to third modification examples.

$$P2=\theta se*Ts' \qquad (4)$$

The turning force (axial force) is used after detection or estimation. In a case where the estimated steering angle θse is calculated by using the detected turning force, a turning force detection device (not illustrated) such as an axial force sensor that is capable of detecting the turning force may be disposed. In addition, in a case where the estimated steering angle θse is calculated by using the estimated turning force, a turning force estimation unit that is capable of estimating the turning force is disposed in the steering ECU 1.

The turning force estimation unit estimates the turning force during the steering operation based on a yaw rate of a vehicle body during the steering operation that is detected by, for example, a yaw rate sensor (not illustrated). Specifically, a vehicle model for estimating the turning force from the yaw rate is disposed in advance and the turning force is calculated based on the yaw rate during the steering operation and the vehicle model.

Herein, the turning force estimation unit can estimate the turning force during the steering operation based on the sum of the steering torque Ts during the steering operation and the steering assist torque. The accuracy of the detection of the steering torque Ts is higher than the accuracy of the detection of the yaw rate. Accordingly, the estimated turning force has a higher level of reliability and accuracy than the turning force that is estimated based on the yaw rate. Accordingly, the accuracy of the estimation of the estimated steering angle θse that is estimated based on this turning force is also high in this case.

In addition, the steering ECU 1 according to this modification example is provided with an estimated steering angle calculation unit that calculates the estimated steering angle θse based on the detected or estimated turning force. The estimated steering angle calculation unit calculates the estimated steering angle θse based on, for example, a map of the correspondence relationship between the turning force and the steering angle θs (estimated steering angle θse).

In the case of a vehicle on which the steering angle variation device (turning characteristic variation device) according to the third modification example is mounted, a turning force in accordance with the change characteristic of the turning angle with respect to the steering angle θs is detected or estimated. In addition, in the case of a vehicle on which the vehicle characteristic variation device (turning characteristic variation device) according to the third modification example is mounted, a turning force in a state where a variation in the turning force resulting from the operation of the vehicle characteristic variation device is included is detected or estimated.

Despite the above-described configuration, the steering control device according to this modification example can achieve effects similar to those of the steering control device according to each of the embodiment and the first to third modification examples.

In the estimated steering angle calculation unit according to this modification example, the estimated steering angle θse may be calculated based on a calculated value (apart from the turning force) based on the yaw rate during the steering operation and the vehicle model and the sum of the steering torque Ts and the steering assist torque. The calculated value and the sum can be regarded as having a unique relationship with the turning force. Accordingly, herein, the estimated steering angle θse may be calculated without estimating the turning force.

Fifth Modification Example

In the steering control device according to this modification example, the range of use of the steering torque Ts that is used during the calculation of the first steering parameter P1 is limited within the range of the steering torque Ts that is generated as a result of the actual steering operation during the calculation of the first steering parameter P1.

In a high-torque area that is out of the range of the actual steering torque Ts, an element relating to the passive steering is insufficient in the calculated steering power P and a damping amount (corrected value Tωr of the damping compensation amount) for the damping control is less likely to be ensured. The steering control device according to this modification example, which excludes the steering torque Ts of this area, can suppress the occurrence of the inconvenience and can improve the stability of the damping control.

During the calculation of the first steering parameter P1, the range of use of the steering angular velocity θs' that is used in the calculation can be limited within the range of the steering angular velocity θs' that is generated as a result of the actual steering operation.

Sixth Modification Example

During the calculation of the second steering parameter P2, the steering control device according to this modification example limits the range of use of the steering torque differential value Ts' that is used in the calculation within the range of the steering torque differential value Ts' that is generated as a result of the actual steering operation.

In a case where the steering torque differential value Ts' that is out of the actual range is used, the damping amount for the damping control during a turn-back steering operation has a non-continuous control amount and the driver may feel uncomfortable. The steering control device according to this modification example, excludes the steering torque differential value Ts' of this range, can suppress the occurrence of the inconvenience and can improve the stability of the damping control.

What is claimed is:

1. A steering control device comprising:
   a steering angle detection unit that detects a steering angle during a steering operation of a steering wheel performed by a driver;
   a corrected steering angle calculation unit that calculates a corrected steering angle by nonlinearly correcting the steering angle detected by the steering angle detection unit in accordance with a steering characteristic of a vehicle;
   a first steering parameter calculation unit that calculates the product of a steering angular velocity and a steering torque during the steering operation as a first steering parameter;
   a second steering parameter calculation unit that calculates the product of the corrected steering angle and a time differential value of the steering torque during the steering operation as a second steering parameter;
   a steering power calculation unit that calculates a steering power showing a steering type of the driver with respect to the steering wheel based on the first steering parameter and the second steering parameter; and
   a control amount calculation unit that calculates a target control amount of an actuator of a steering device based on the steering power.

2. The steering control device according to claim 1, wherein
   the corrected steering angle calculation unit calculates the corrected steering angle such that an amount of change of the corrected steering angle per unit time with respect to an amount of change of the steering angle per unit time in a case where the absolute value of the steering angle exceeds a first angle is lower than the amount of change of the steering angle per unit time with respect to an amount of change of the steering angle per unit time in a case where the absolute value of the steering angle is equal to or less than the first angle.

3. The steering control device according to claim 1, wherein
   the corrected steering angle calculation unit maintains the corrected steering angle to be constant at the corrected steering angle when the steering angle is a first angle in a case where the absolute value of the steering angle exceeds the first angle.

4. The steering control device according to claim 2, wherein
   the corrected steering angle calculation unit calculates the corrected steering angle such that the amount of change of the corrected steering angle per unit time with respect to the amount of change of the steering angle per unit time in a case where the absolute value of the detected steering angle is equal to or less than a second angle that is smaller than the first angle is smaller than the amount of change of the corrected steering angle per unit time with respect to the amount of change of the steering angle per unit time in a case where the absolute value of the steering angle exceeds the second angle and is equal to or less than the first angle.

5. The steering control device according to claim 1, wherein
the corrected steering angle calculation unit calculates the corrected steering angle allowing for a change characteristic of a turning angle of a turning wheel with respect to the steering angle or a change characteristic of a turning force to the turning wheel with respect to the steering angle.

6. A steering system comprising:
a steering angle detection unit that detects a steering angle of a steering wheel;
a steering torque detection unit that detects a steering torque with respect to the steering wheel;
an ECU that calculates a corrected steering angle by non-linearly correcting the steering angle, a first steering parameter as the product of an angular velocity of the steering angle and the steering torque, a second steering parameter as the product of the corrected steering angle and a time differential value of the steering torque, and a target control amount based on the first steering parameter and the second steering parameter; and
a steering support unit that applies a rotation torque to the steering wheel based on the target control amount.

7. The steering system according to claim 6, wherein
the ECU calculates the corrected steering angle such that an amount of change of the corrected steering angle with respect to an amount of change of the steering angle in a case where the absolute value of the steering angle exceeds a first angle is smaller than the amount of change of the corrected steering angle with respect to the amount of change of the steering angle in a case where the absolute value of the steering angle is equal to or less than the first angle.

* * * * *